US006740418B2

(12) United States Patent
Lewis et al.

(10) Patent No.: US 6,740,418 B2
(45) Date of Patent: May 25, 2004

(54) LOW TEMPERATURE CURABLE ORGANOPOLYSILOXANE COATINGS

(75) Inventors: Larry N. Lewis, Scotia, NY (US); Michael J. O'Brien, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/170,596

(22) Filed: Jun. 12, 2002

(65) Prior Publication Data

US 2002/0150766 A1 Oct. 17, 2002

Related U.S. Application Data

(62) Division of application No. 09/454,932, filed on Dec. 3, 1999, now Pat. No. 6,428,897.
(60) Provisional application No. 60/156,082, filed on Sep. 24, 1999.

(51) Int. Cl.$^7$ .................................................. B32B 3/00
(52) U.S. Cl. ....................... 428/447; 428/689; 502/326; 528/31; 427/301
(58) Field of Search .................... 427/301; 428/689, 428/447; 502/326; 528/31

(56) References Cited

U.S. PATENT DOCUMENTS

| | | | |
|---|---|---|---|
| 2,869,722 A | | 1/1959 | Marander et al. |
| 2,902,998 A | * | 9/1959 | Durandeaux |
| 2,940,875 A | | 6/1960 | Smith et al. |
| 3,046,160 A | | 7/1962 | Dengler |
| 3,050,411 A | | 8/1962 | Kell |
| 3,282,738 A | * | 11/1966 | Langer et al. |
| 3,463,661 A | | 8/1969 | Benson |
| 3,712,848 A | * | 1/1973 | Casey et al. |
| 4,069,368 A | | 1/1978 | Deyak et al. |
| 4,332,844 A | | 6/1982 | Hamada et al. |
| 4,448,815 A | | 5/1984 | Grenoble et al. |
| 4,451,317 A | | 5/1984 | Oizumi et al. |
| 4,769,308 A | | 9/1988 | Hiruma et al. |
| 5,225,248 A | | 7/1993 | Stephenson |
| 5,356,987 A | | 10/1994 | Stephenson |
| 5,413,809 A | | 5/1995 | Hazana |
| 5,578,346 A | | 11/1996 | Moy |
| 5,580,610 A | | 12/1996 | Moy |
| 5,635,578 A | * | 6/1997 | Arai et al. |
| 5,698,654 A | | 12/1997 | Nye et al. |
| 5,753,751 A | | 5/1998 | Liao et al. |

FOREIGN PATENT DOCUMENTS

JP 63-148547 * 6/1988

* cited by examiner

*Primary Examiner*—Kuo-Liang Peng

(57) ABSTRACT

A method of making a coated substrate which includes the steps of applying a layer of a coating composition, said coating composition comprising an alkenyl functional organopolysiloxane and a hydride functional organopolysiloxane, to the substrate, said substrate comprising a catalytically effective amount of a precious metal catalyst, and allowing the layer to cure, allows the use of a non-catalyzed coating bath having a very long useful life, while providing a highly reactive coating layer that may be rapidly cured at low temperature.

11 Claims, No Drawings

LOW TEMPERATURE CURABLE ORGANOPOLYSILOXANE COATINGS

This application is a Divisional application of U.S. Ser. No. 09/454,932 field Dec. 3, 1999, now U.S. Pat. No. 6,428,897, which claims rights of priority from U.S. Provisional Patent Application Ser. No. 60/156,082, filed Sep. 24, 1999. Other Divisional applications of U.S. Ser. No. 09/454,932 are co-pending.

FIELD OF THE INVENTION

The present invention relates to a low temperature curable coatings, more particularly to addition curable organopolysiloxane coatings that cure rapidly at low temperature.

BRIEF DESCRIPTION OF THE RELATED ART

Addition curable release coating compositions and their use as release coatings are known, see, for example, coassigned U.S. Pat. No. 4,448,815. A layer of such coating is typically applied to a substrate, such as paper, from a reactive coating bath which contains an alkenyl-functional organopolysiloxane, a hydride-functional organopolysiloxane, a precious metal catalyst and a cure inhibitor. Once applied, the layer of coating is cured by exposing the coated substrate to elevated temperature.

The cure inhibitor retards cure of the coating and enables a balance between a long useful coating bath life at low temperature and rapid cure speed at elevated temperature to be maintained. There is a constant desire in the art to provide increased cure speed without compromising bath life.

The need to subject the coated substrate to elevated temperature to cure the coating layer introduces some drawbacks to the use of addition cure organopolysiloxane release coatings coating process, in the form of energy costs, a need to rehydrate coated paper substrates after curing and a limited ability to use such coatings to coat temperature sensitive substrates, such as, for example, some polymer films. Due to these drawbacks, there is a desire in the art to provide coatings that are curable at lower temperature without compromising bath life.

SUMMARY OF THE INVENTION

In a first aspect, the present invention is directed to a method of making a coated substrate.

In a first embodiment, a method of making a coated substrate comprises: applying a layer of a coating composition, said coating composition comprising an alkenyl functional organopolysiloxane and a hydride functional organopolysiloxane, to a substrate, said substrate comprising a catalytically effective amount of a precious metal catalyst, and allowing the layer to cure.

In a second embodiment, a method of making a coated substrate comprises: applying a layer of a first component of a coating composition, said first component comprising an alkenyl functional organopolysiloxane and a catalytically effective amount of a precious metal catalyst to a substrate, applying a layer a second component of a coating composition, said second component comprising a hydride functional organopolysiloxane, to the substrate, and allowing the layers of coating composition to cure.

In a third embodiment, a method of making a coated substrate comprises: applying a layer of a coating composition, said coating composition comprising organopolysiloxane having both alkenyl and hydride radicals present on the same molecule, to the substrate, said substrate comprising a catalytically effective amount of a precious metal catalyst, and allowing the layer to cure.

The method of the present invention allows the use of a non-catalyzed coating bath having a very long useful life, while providing a highly reactive coating layer that may be rapidly cured at low temperature and thereby avoids some of the drawbacks, for example, high energy costs, the need to rehydrate paper substrates and the limited applicability to temperature sensitive substrates, that characterize typical addition cure coatings.

Another aspect of the present invention is directed to a catalyzed article comprising a substrate selected from paper sheets, polymer films, polymer coated paper sheets and metal foils, and a precious metal catalyst disposed on at least one surface of the substrate.

Another aspect of the present invention is directed to a method of forming a catalyzed article, comprising: forming a dilute catalyst by dissolving a precious metal catalyst in a volatile organic or organosiloxane solvent; or by dispersing a precious metal catalyst in a binder composition; or by dispersing a precious metal catalyst in a film forming polymer composition, and applying the dilute catalyst to the substrate, wherein the composition of the dilute catalyst and application rate of dilute catalyst on the substrate are selected to provide a selected amount of precious metal per unit area of substrate surface.

DETAILED DESCRIPTION OF THE INVENTION

Alkenyl functional organopolysiloxanes suitable for use in the method of the present invention are those including structural units of the formula (I):

$$R^1_a SiO_{4-a/2} \qquad (I)$$

wherein:

each $R^1$ is independently hydroxyl or a monovalent hydrocarbon radical, and a is an integer wherein $0 \leq a \leq 3$, provided that at least two $R^1$ groups per molecule of such alkenyl functional organopolysiloxane are each independently alkenyl radicals.

As used herein "monovalent hydrocarbon radical" means a monovalent acyclic hydrocarbon radical, a monovalent alicyclic hydrocarbon radical or a monovalent aromatic hydrocarbon radical.

As used herein, the terminology "acyclic hydrocarbon radical" means a monovalent straight chain or branched hydrocarbon radical, preferably containing from 2 to 20 carbon atoms per radical, which may be saturated or unsaturated and which may be optionally substituted or interrupted with one or more functional groups, such as, for example, carboxyl, cyano, hydroxy, halo and oxy. Suitable monovalent acyclic hydrocarbon radicals include, for example, alkyl, alkenyl, alkynyl, hydroxyalkyl, cyanoalkyl, carboxyalkyl, carboxamide, a]kylamido and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, carboxymethyl, chloromethyl and 3,3,3-fluoropropyl.

As used herein the term "alkyl" means a saturated straight or branched monovalent hydrocarbon radical. In a preferred embodiment, monovalent alkyl groups are selected from linear or branched alkyl groups containing from 1 to 12 carbons per group, such as, for example, methyl, ethyl, propyl, iso-propyl, n-butyl, iso-butyl, sec-butyl, tert-butyl, pentyl, hexyl, heptyl, decyl, dodecyl.

As used herein the term "alkenyl" means a straight or branched monovalent terminally unsaturated hydrocarbon radical, preferably containing from 2 to 10 carbon atoms per radical, such as, for example, ethenyl, 2-propenyl, 3-butenyl, 5-hexenyl, 7-octenyl and ethenylphenyl.

As used herein, the terminology "monovalent alicyclic hydrocarbon radical" means a monovalent radical containing one or more saturated hydrocarbon rings, preferably containing from 4 to 10 carbon atoms per ring, per radical which may optionally be substituted on one or more of the rings with one or more alkyl radicals, each preferably containing from 2 to 6 carbon atoms per group, halo radicals or other functional groups and which, in the case of a monovalent alicyclic hydrocarbon radical containing two or more rings, may be fused rings. Suitable monovalent alicyclic hydrocarbon radicals include, for example, cyclohexyl and cyclooctyl.

As used herein, the terminology "monovalent aromatic hydrocarbon radical" means a monovalent hydrocarbon radical containing one or more aromatic rings per radical, which may, optionally, be substituted on the aromatic rings with one or more alkyl radicals, each preferably containing from 2 to 6 carbon atoms per group, halo radicals or other functional groups and which, in the case of a monovalent aromatic hydrocarbon radical containing two or more rings, may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl, anthryl.

In a preferred embodiment, the alkenyl functional organopolysiloxane comprises one or more organopolysiloxane polymers or copolymer of the formula (II):

$$M^1{}_b M^{vi}{}_c D^1{}_d D^{vi}{}_e T^1{}_f T^{vi}{}_g Q_h \qquad (II)$$

wherein:
- $M^1$ is $R^2{}_3 SiO_{1/2}$,
- $M^{vi}$ is $R^3{}_2 R^4 SiO_{1/2}$,
- $D^1$ is $R^5{}_2 SiO_{2/2}$,
- $D^{vi}$ is $R^6 R^7 SiO_{2/2}$,
- $T^1$ is $R^8 SiO_{3/2}$,
- $T^{vi}$ is $R^9 SiO_{3/2}$,
- Q is $SiO_{4/2}$,
- each $R^2$, $R^3$, $R^5$, $R^6$ and $R^8$ is independently hydroxyl or a monovalent hydrocarbon radical,
- each $R^4$, $R^7$ and $R^9$ is independently alkenyl,
- b, c, d, e, f, g and h are each integers selected to provide polymer a having a viscosity of from 50 to 50,000 centiStokes ("cSt") and having a desired amount of alkenyl groups per molecule, provided at least one of c, e and g is greater than 0, so that the alkenyl functional organopolysiloxane contains at least two alkenyl radicals per molecule.

In a preferred embodiment, $R^2$, $R^3$, $R^5$, $R^6$ and $R^8$ are each $(C_1-C_6)$alkyl, most preferably methyl, $R^4$, $R^7$ and $R^9$ are each independently a terminally unsaturated $(C_2-C_6)$alkenyl radical, more preferably, ethenyl or 5-hexenyl.

In a preferred embodiment, the coefficients b, c, d, e, f, g and h are selected to provide a having a viscosity of from 100 to 1000 cSt, more preferably from 150 to 500 cSt.

In a more highly preferred embodiment, the alkenyl functional organopolysiloxane comprises one or more compounds selected from: linear alkenyl-stopped dialkylsiloxane polymers of the formula $M^{vi}{}_2 D^1{}_d$, branched alkenyl-stopped dialkylsiloxane polymers of the formula $M^1{}_b M^{vi}{}_c D^1{}_d T^1{}_f$, siloxane polymers of the formula $M^1{}_b M^{vi}{}_c D^1{}_d T^1{}_f$, alkenyl-stopped alkylalkenyl dialkylpolysiloxane copolymers of the formula $M^1{}_b M^{vi}{}_c D^1{}_d D^{vi}{}_e$, wherein $M^1$, $M^{vi}$, $D^1$, $D^{vi}$, $T_f$, Q, b, c, d, e and h are each defined as above, and wherein $R^2$, $R^3$, $R^5$, $R^6$ and $R^8$ are each alkyl, preferably methyl, and wherein $R^4$ and $R^7$ are each preferably ethenyl.

Hydride functional organopolysiloxanes suitable for use in the method of the present invention are those including structural units of the structural formula (III):

$$R^{10}{}_i SiO_{4-i/2} \qquad (III)$$

wherein
- each $R^{10}$ is independently H or a monovalent hydrocarbon radical, and a is an integer wherein $0 \leq i \leq 3$,
- provided that at least two $R^{10}$ groups per molecule of such hydride functional organopolysiloxane are each H.

In a preferred embodiment, the hydride functional organopolysiloxane is an organopolysiloxane of the structural formula (IV):

$$M^2{}_j M^H{}_k D^2{}_l D^H{}_m T^2{}_n T^H{}_o Q_p \qquad (IV)$$

wherein:
- $M^2$ is $R^{11}{}_3 SiO_{1/2}$,
- $M^H$ is $R^{12}{}_2 R^{13} SiO_{1/2}$,
- $D^2$ is $R^{14}{}_2 SiO_{2/2}$,
- $D^H$ is $R^{15} R^{16} SiO_{2/2}$,
- $T^2$ is $R^{17} SiO_{3/2}$,
- $T^H$ is $R^{18} SiO_{3/2}$,
- Q is $SiO_{4/2}$,
- each $R^{11}$, $R^{12}$, $R^{14}$, $R^{15}$ and $R^{17}$ is independently a monovalent hydrocarbon radical,
- $R^{13}$, $R^{16}$ and $R^{18}$ are each H,
- j, k, l, m, n, o and p are each integers selected to provide a polymer having a viscosity of from 1 to 1000 cSt and a desired amount of silicon-bonded H radicals per molecule, provided at least one of k, m and o is greater than 0, so that the hydride functional organopolysiloxane contains at least two silicon-bonded H radicals per molecule.

In a preferred embodiment, $R^{11}$, $R^{12}$, $R^{14}$ and $R^{15}$ are each $(C_1-C_6)$alkyl, most preferably methyl.

In a preferred embodiment, the coefficients b, c, d, e, f, g and h are selected to provide a having a viscosity of from 10 to 150 cSt, more preferably from 20 to 80 cSt.

In a more highly preferred embodiment, the hydride functional organopolysiloxane comprises one or more compounds selected from trialkylsiloxy-stopped alkyl hydrogen polysiloxanes of the formula $M^2{}_j D^H{}_m$, trialkylsiloxy-stopped alkylhydrogen dialkylpolysiloxane copolymers of the formula $M^2{}_j D^2{}_l D^H{}_m$, wherein $M^2$, $D^2$, $D^H$, j, l and m are each defined as above, and wherein $R^{11}$, $R^{14}$ and $R^{15}$ are each alkyl, preferably methyl.

In an alternative embodiment, the coating composition comprises an organopolysiloxane having both alkenyl and hydride radicals present on the same molecule, such as for example the organopolysiloxanes disclosed in coassigned U.S. Pat. Nos. 5,698,654 and 5,753,751, the disclosure of which is hereby incorporated herein by reference.

In a preferred embodiment, the alkenyl and hydride functional organopolysiloxane comprises one or more organopolysiloxanes of the formula (V):

$$M^1{}_q M^{vi}{}_r M^H{}_s D^1{}_u D^H{}_v T^1{}_w T^{vi}{}_x T^H{}_y Q_z \qquad (V)$$

wherein; $M_1$, $M_{vi}$, $M_H$, $D_1$, $D_{vi}$, $D_H$, $T_1$, $T_{vi}$, $T_H$, Q are each defined as above and q, r, s, t, u, v, w, x, y and z are each integers selected to provide polymer a having a viscosity of from 50 to 50,000 cSt and having a desired amount of alkenyl groups and silicon-bonded H radicals per molecule, provided that each molecule contains at least two alkenyl groups and at least two silicon-bonded H radical.

In a preferred embodiment coating composition exhibits a molar ratio of silicon bonded hydrogen on the hydride functional organopolysiloxane to alkenyl groups on the alkenyl functional organopolysiloxane ("Si—H:alkenyl ratio") of from 1:5 to 5:1, more preferably from 1:1 to 4:1 and even more preferably from 1.2:1 to 2.5:1.

The coating composition used in the method of the present invention may optionally include other components known in the art, such as, for example, nonreactive diluents, such as for example, solvents such as water, hydrocarbon fluids and non-functionalized silicone oils, reactive diluents, such as, for example, vinyl ether compounds, cure inhibitors, cure rate accelerators, fillers, controlled release additives and colorants.

Substrates suitable for use in the method of the present invention include paper, such as for example, supercalendered kraft paper, glassine paper, machine finished paper and machine glazed paper, and polymer films, such as, for example, polyolefins, polyesters and polystyrenics, metal foils, such as for example, aluminum foil and composite substrates, such as for example, polyolefin coated kraft paper.

Precious metal catalysts suitable for use in the method of the present invention are those capable of catalyzing the cure of an addition curable siloxane coating composition. In a preferred embodiment, the precious metal catalyst comprises one or more of platinum and rhodium. Suitable precious metal catalysts include, for example, chloroplatinic acid, precious metal salts, such as for example, sodium or potassium salts of chloroplatinic acid, platinum halides, organometallic complexes, such as for example, Karstedt's catalyst, platinum cyclohexadiene complex, platinum acetyl acetonate complex, as well as olefinic ligands of platinum or rhodium, and supported precious metal catalysts, such as platinum deposited on silica or alumina particles, which provide the precious metal in a form that is suitable for catalyzing the cure of the organopolysiloxane mixture of the coating composition used in the method of the present invention. In a preferred embodiment, the precious metal catalyst comprises a platinum complex of divinyl tetramethyl disiloxane.

In a preferred embodiment, a dilute form of the precious metal catalyst is made by dissolving the catalyst in a solvent, such as for example, hexane, heptane, octane or a mixture thereof or an organopolysiloxane, or by dispersing the catalyst in a binder composition, for example, a binder composition for finishing paper comprising a polymer latex and an inorganic filler, or by dispersing the catalyst in a film forming polymer composition, such as, for example, polyvinyl alcohol or a polyacrylate composition, and the dilute form of catalyst is applied to the substrate, by for example, spray coating, roll coating, rod coating or extrusion, to form a precious metal catalyst-containing substrate.

Alternatively, the catalyst is dissolved in an alkenyl functional organopolysiloxane and a layer of the an alkenyl functional organopolysiloxane/catalyst solution is applied to the substrate.

As used herein, "catalytically effective amount" means an amount effective to catalyze the cure of a layer of coating disposed on the substrate. In a preferred embodiment, the precious metal catalyst-containing substrate contains greater than about 0.000001 g, more preferably from 0.00005 to 0.01 g, and still more preferably, from 0.0005 to 0.001 g, of precious metal per square meter of substrate surface.

A layer of the coating composition is applied to the substrate by for example, spray coating, roll coating, rod coating or extrusion and allowed to cure. The layer of coating composition may be allowed to cure at uncontrolled ambient temperature or may be allowed to cure at an elevated temperature, such as for example, a temperature of up to about 100° C., more preferably up to about 70° C., and still more preferably, up to about 40° C.

The coated substrate made by the method of the present invention is useful a release liner for pressure sensitive adhesive-backed articles such as, for example, adhesive labels and adhesives tapes.

An adhesive laminate comprises a coated substrate made by the method of the present invention laminated with a pressure sensitive adhesive coated substrate, such that the cured coating layer of the coated substrate made by the method of the present invention is in contact with the pressure sensitive adhesive layer on the pressure sensitive adhesive coated substrate. Suitable pressure sensitive adhesive compositions, such as, for example, emulsion acrylic adhesives, solvent acrylic adhesives, hot melt adhesives, emulsion rubber adhesive, solvent rubber adhesives, and methods for making pressure sensitive adhesive coated substrates are well known in the art. The pressure sensitive adhesive coated substrate may be easily removed from the coated substrate made by the method of the present invention and applied to another substrate, as desired.

EXAMPLE 1

A paper substrate (super-calendered kraft paper) was coated with a xylene solution of Karstedt's catalyst by applying approximated 1 milliliter of a 5% platinum by weight solution to a 6 inch by 3 inch paper sheet and then allowing the xylene to evaporate. A layer of a coating composition containing 5 grams of a vinyl stopped dimethylsiloxane polymer (structural formula $M^{vi}_2 D^1_d$, wherein $M^{vi}$, $D^1$ and d are each as described above, and $R^3$ and $R^5$ are each methyl, $R^4$ is ethenyl, and exhibiting a viscosity of about 250 cSt) and 0.5 grams of a trimethylsiloxy-stopped methylhydrogen dimethylsiloxane polymer (formula $M^2_2 D^2_l D^H_m$, wherein $M^2$, $D^2$, $D^H$, 1 and m are each as described above, $R^{11}$, $R^{14}$ and $R^{15}$ are each methyl and $R^{16}$ is H, containing approximately 1 wt % hydride radicals and exhibiting a viscosity of about 35 cSt) was applied to the platinum-containing paper substrate in a bead and drawn down across the paper with a straight metal edge. Cure was qualitatively assessed by rubbing the layer with a fingertip immediately after application of the coating layer to the substrate. The coating did not smear, indicating that the coating had cured very rapidly at room temperature.

EXAMPLE 2

A hexenyl-stopped polydimethyl siloxane polymer (structural formula $M^{vi}_2 D^1_d$, wherein $M^{vi}$, $D^1$ and d are each as described above, $R^3$ and $R^5$ are each methyl, and $R^4$ is hexenyl, and exhibiting a viscosity of about 250 cSt) was mixed with Karstedt's catalyst to make a mixture containing 270 parts per million platinum. The platinum-catalyzed polysiloxane mixture was applied to a paper substrate (super-calendered kraft paper) by the same technique as described above in Example 1. The coated paper was then coated with a layer of the trimethylsiloxy-stopped methylhydrogen dimethylsiloxane polymer described above in Example 1. The coating was found to have cured within 15 seconds of the application of the trimethylsiloxy-stopped methylhydrogen dimethylsiloxane polymer.

EXAMPLE 3

A solution of a platinum divinyl tetramethyl siloxane complex in hexane (0.5% Pt) was coated on Kammerer AV100 glassine paper using a #3 Meyer rod and the solvent was then flashed off for 10 seconds at 160° F. in a forced air oven to form a Pt coated paper substrate. A mixture of 50 parts by weight ("pbw") of a vinyl-stopped dimethylsiloxane polymer (formula $M^{vi}_2D^1_d$, wherein $M^{vi}$, $D^1$ and d are each as described above, and $R^3$ and $R^5$ are each methyl, $R^4$ is ethenyl, and exhibiting a viscosity of about 225 cSt) and 2.5 pbw of the trimethylsilyl-stopped methylhydrogen dimethyl polysiloxane copolymer used in Example 1 were coated on top of the Pt-coated paper using a doctor blade. The liquid coating was found to cure almost immediately on contact with the Pt-coated paper substrate.

The extent of cure was qualitatively assessed by a tape migration test and rubbing the surface of the cured siloxane coating layer with a fingertip. The tape migration test was conducted by firmly pressing the adhesive side of a piece of 3M Scotch® 610 tape to the surface of the cured siloxane coating, peeling the tape off and then making a loop of the tape such that the adhesive side of the tape was brought into contact with itself. Migration of uncured siloxane coating to the adhesive side of the tape would interfere with the ability of the tape to stick to itself. The surface of the cured coating layer was then rubbed vigorously with a fingertip and then the surface was visually examined. Smearing of the coating layer was taken as being indicative of an incompletely cured coating layer. The relative difficulty of marking the coating, that is, making visually detectable deformations of the coating surface, by fingertip rubbing was taken as being indicative of the hardness of the cured coating layer, with increasing difficulty in marking being indicative of greater hardness.

The tape migration test for the coating of Example 3 showed that the tape stuck to itself well, indicating that it had not been contaminated with a significant amount of silicone. The coating of Example 3 did not smear, but could be marked fairly easily when the surface of the coating was rubbed with a fingertip.

EXAMPLE 4

The procedure of Example 3 was repeated, except that the silicone coated paper, was place in a forced air oven at 160° F. for 5 seconds immediately after coating the paper with the silicone mixture.

The tape migration test for the coating of Example 4 showed that the tape stuck to itself well, indicating that it had not been contaminated with a significant amount of silicone. The coating of Example 4 did not smear, but could be marked somewhat when the surface of the coating was rubbed with a fingertip.

EXAMPLE 5

The procedure of Example 3 was repeated, except that Thilmany polyethylene kraft (PEK) substrate was substituted for the Kammerer AV100 glassine paper.

The tape migration test for the coating of Example 5 showed that the tape stuck to itself well, indicating that it had not been contaminated with a significant amount of silicone. The coating of Example 5 did not smear and exhibited no marking when the surface of the coating was rubbed with a fingertip.

EXAMPLE 6

The procedure of Example 5 was repeated, except that the silicone formulation used was a mixture of 50 pbw of a branched alkenyl functional polymer (approximate structure $M^{vi}_{3.75}M^1_{0.5}T^1_{4.5}D^1_{100}$, wherein $M^1$, $M^{vi}$, $T^1$ and $D^1$ are each defined as above, with $R^2$, $R^3$, $R^5$ and $R^8$ each being methyl and $R^4$ being ethenyl, and exhibiting a viscosity of 208 cSt) and 3.0 pbw of the methyl hydrogen dimethyl polysiloxane copolymer used in Example 3.

The tape migration test for the coating of Example 6 showed that the some migration to the tape immediately after coating, as evidenced by the fact that the tape did not stick well to itself after being in contact with the siloxane coating layer. The coating of Example 6 smeared when rubbed with a fingertip. A recheck after about a minute showed no migration to the tape and no smearing of the coating.

EXAMPLE 7

The procedure of Example 3 was repeated, except that a 2 mil polyester film was substituted for was substituted for the Kammerer AV100 glassine paper used in Example 3.

The tape migration test for the coating of Example 7 showed that the tape stuck to itself well, indicating that it had not been contaminated with a significant amount of silicone. The coating of Example 7 did not smear and exhibited some marking when the surface of the coating was rubbed with a fingertip.

EXAMPLE 8

The silicone coating composition of Example 6 was coated on a Pt-treated 2 mil polyester film and then heated at 160° F. for 10 seconds.

The tape migration test for the coating of Example 8 showed that the tape stuck to itself well, indicating that it had not been contaminated with a significant amount of silicone. The coating of Example 8 did not smear and exhibited some marking when the surface of the coating was rubbed with a fingertip.

The method of the present invention allows the use of a non-catalyzed coating bath having a very long useful life, while providing a highly reactive coating layer that may be rapidly cured at low temperature and thereby avoids some of the drawbacks, for example, high energy costs, the need to rehydrate paper substrates and the limited applicability to temperature sensitive substrates, that characterize typical addition cure coatings.

What is claimed is:

1. A method for making a catalyst-containing article comprising applying a selected amount of a precious metal catalyst to at least one surface of a substrate, followed by applying an addition curable siloxane coating composition on said precious metal catalyst, wherein said catalyst capable of catalyzing the cure of said addition curable siloxane coating composition.

2. The method of claim 1, wherein the precious metal catalyst is formed by dissolving the catalyst in a solvent, by dispersing the catalyst in a binder composition or by dispersing the catalyst in a film-forming composition.

3. The method of claim 1, wherein the precious metal catalyst comprises on or more of platinum or rhodium.

4. The method of claim 1, wherein the catalyst is formed by dissolving a precious metal catalyst in a volatile organic or organosiloxane solvent comprising one or more of hexane, heptane, octane and organopolysiloxanes.

5. The method of claim 1, wherein the catalyst is formed by dispersing a precious metal catalyst in a binder composition comprising a polymer latex and an inorganic filler.

6. The method of claim 1, wherein the dilate catalyst is formed by dispersing a precious metal catalyst in a film-forming polymer composition the film-forming polymer composition comprising a film-forming polyvinyl alcohol composition or a film-forming polyacrylate composition.

7. The method of claim 1, wherein the catalyst is applied to the substrate by spray coating, roll coating, rod coating or extrusion.

8. The method of claim 1, wherein the selected amount of precious metal catalyst is greater than about 0.000001 gram of precious metal catalyst per square meter of substrate surface.

9. The method of claim 1, wherein the selected amount of precious metal catalyst is from 0.00005 gram to 0.01 gram of precious metal catalyst per square meter of substrate surface.

10. The method of claim 1, wherein the selected amount of precious metal catalyst is from 0.0005 gram to 0.001 gram of precious metal per square meter of substrate surface.

11. An article made by the method of claim 1.

* * * * *